(12) United States Patent
Morrow, Sr. et al.

(10) Patent No.: US 7,287,671 B2
(45) Date of Patent: Oct. 30, 2007

(54) BEVERAGE DISPENSER MODULAR MANIFOLD

(75) Inventors: James R. Morrow, Sr., Union, MO (US); Jerry L. Landers, Memphis, IN (US); William Derek Slone, Charlestown, IN (US)

(73) Assignee: Manitowoc Foodservice Companies, Inc., Reno, NV (US)

( * ) Notice: Subject to any disclaimer, the term of this patent is extended or adjusted under 35 U.S.C. 154(b) by 191 days.

(21) Appl. No.: 11/107,165

(22) Filed: Apr. 15, 2005

(65) Prior Publication Data

US 2005/0230421 A1 Oct. 20, 2005

Related U.S. Application Data

(60) Provisional application No. 60/562,707, filed on Apr. 16, 2004.

(51) Int. Cl.
*B67D 5/56* (2006.01)

(52) U.S. Cl. .................. 222/129.1; 222/145.1

(58) Field of Classification Search ............ 222/129.1, 222/129.2, 129.3, 129.4, 145.1, 145.5
See application file for complete search history.

(56) References Cited

U.S. PATENT DOCUMENTS

| | | | |
|---|---|---|---|
| 5,335,819 | A | 8/1994 | Martin |
| 5,381,926 | A | 1/1995 | Credle, Jr. et al. |
| 5,685,458 | A | 11/1997 | Durham et al. |
| 5,725,125 | A | 3/1998 | Bessette et al. |
| 5,881,922 | A | 3/1999 | Hawkins et al. |
| 5,931,348 | A | 8/1999 | Guadalupi |
| 5,954,235 | A | 9/1999 | Schroeder et al. |
| 5,984,142 | A | 11/1999 | Castaldi |
| 6,164,083 | A | 12/2000 | Leeming et al. |
| 6,192,935 | B1 | 2/2001 | Schroeder et al. |
| 6,196,007 | B1 | 3/2001 | Schroeder et al. |
| 6,237,810 | B1 | 5/2001 | Credle, Jr. |
| 6,286,721 | B1 | 9/2001 | Pellegrini |
| 6,328,070 | B2 | 12/2001 | Clayton et al. |
| 6,375,042 | B1 | 4/2002 | Goodwin |
| 6,502,725 | B1 | 1/2003 | Alexander |
| 6,685,059 | B2 | 2/2004 | Jones et al. |
| 6,698,229 | B2 | 3/2004 | Renken et al. |
| 6,698,621 | B2 | 3/2004 | Landers et al. |
| 2001/0011660 | A1 | 8/2001 | Schroeder et al. |
| 2001/0030308 | A1 | 10/2001 | Schroeder et al. |
| 2001/0032672 | A1 | 10/2001 | Schroeder et al. |
| 2002/0056721 | A1 | 5/2002 | Phillips et al. |
| 2002/0084284 | A1 | 7/2002 | Landers et al. |
| 2003/0183652 | A1 | 10/2003 | Tinucci et al. |
| 2004/0168466 | A1 | 9/2004 | Landers et al. |
| 2004/0245288 | A1 * | 12/2004 | Tobler .................. 222/129.1 |

OTHER PUBLICATIONS

International Search Report dated Jul. 13, 2005 for PCT Application No. PCT/US2005/013053.

* cited by examiner

*Primary Examiner*—Joseph A. Kaufman
(74) *Attorney, Agent, or Firm*—Brinks Hofer Gilson & Lione; Steven P. Shurtz

(57) ABSTRACT

A beverage dispenser modular manifold routes carbonated water and non-carbonated water to a plurality of outlet ports for dispensing water for mixing with syrup and dispensing a beverage. A selector allows a store owner or manager to set the manifold to dispense one of carbonated water and non-carbonated water for each mixing and dispensing nozzle in the beverage dispenser. The manifold may be combined with similar manifolds to provide as many dispensing stations as desired in a beverage dispenser. Syrup modular manifolds may also be included.

20 Claims, 6 Drawing Sheets

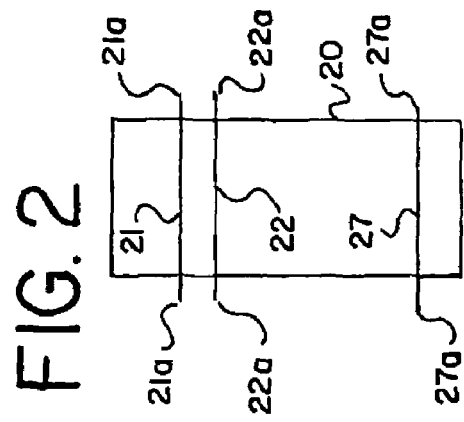
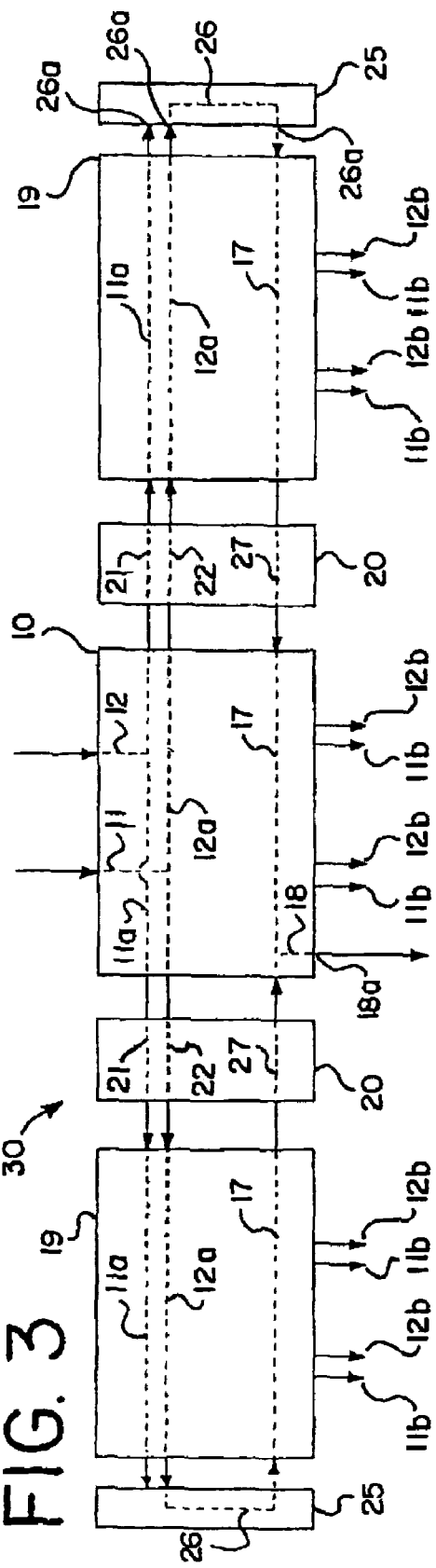
FIG. 1
FIG. 2
FIG. 3

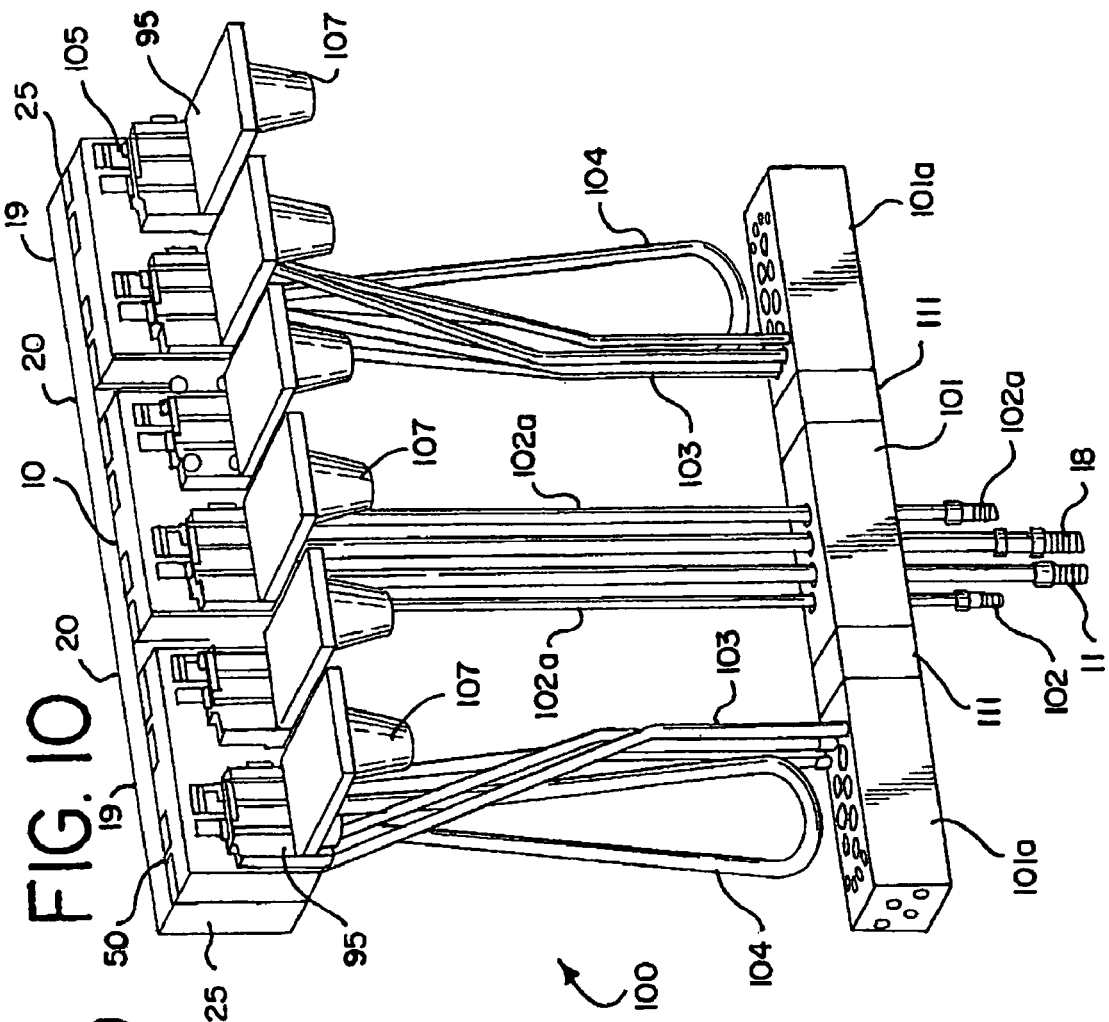

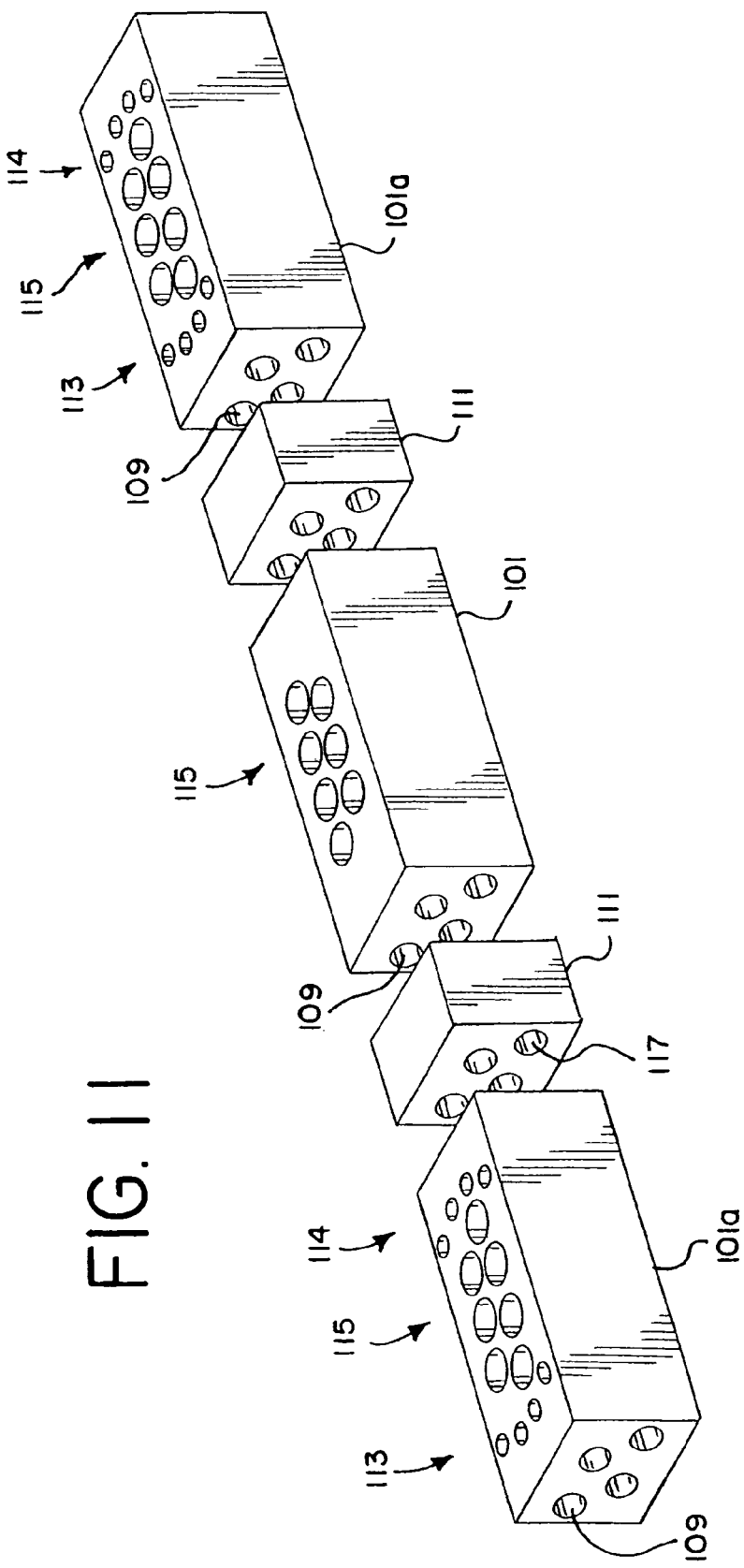

BEVERAGE DISPENSER MODULAR MANIFOLD

This application claims the benefit of the filing date under 35 U.S.C. § 119(e) of Provisional U.S. Patent Application Ser. No. 60/562,707, filed on Apr. 16, 2004, which is hereby incorporated by reference in its entirety.

FIELD OF THE INVENTION

The field of the invention is that of beverage dispensers and in particular a beverage dispenser modular manifold for routing water in a beverage dispenser.

BACKGROUND OF THE INVENTION

Beverage dispensers are widely used to dispense drinks in a variety of establishments. Fast-food outlets, roadside convenience stores, re-fueling stations, and cafeterias are examples of locations involving high volume consumption of soft drinks. Because of the high volume, these dispensers must have sophisticated systems for storing and delivering the components expected in a drink: ice, water (carbonated or non-carbonated), and syrup, the latter two in a properly-mixed proportion. By syrup is meant any drink syrup or concentrate that is meant to be mixed with water, carbonated water, or non-carbonated water, before a beverage with the syrup or concentrate is consumed. Syrups may include soft-drink syrup, citrus concentrate such as lemonade, any "iced-tea" type concentrate, or other flavoring suitable for mixing with water before consuming.

Water and syrup should be cooled before being dispensed, and ice may typically also be dispensed with a beverage. Such high volume dispensers require considerable installation time and tend to be large and expensive, with under-counter or backroom storage of pressurized syrup tanks and associated tubing, and heat exchangers chilling the water and syrup to the precisely desired degree in time for dispensing and serving.

A facility with lower volume requirements does not need such an expensive and sophisticated system, but may still wish to deliver the authentic taste of a freshly-mixed ("post-mixed") carbonated or non-carbonated drink. In this case what is needed is a lower-volume soft-drink dispenser, costing much less and requiring less of a "footprint" area for its placement on the floor of a kitchen, a cafeteria or a break area.

However, once a smaller machine is purchased and installed, demand may change and outpace the ability of the beverage dispenser to quickly dispense the required quantity of beverages. In addition, new flavors may need to be added for marketing purposes and in response to consumer tastes and demands. On the other hand, if a larger machine is purchased and demand falls, the space required for the larger machine may not be justified by the lower demand for its use. What is needed is a beverage dispenser that is able to expand in size if additional flavors are desired, or if demand increases. What is also needed is a beverage dispenser that may require less space if demand drops. These needs are met by beverage dispenser using embodiments of the present invention.

BRIEF SUMMARY

One aspect of the invention is a combination of at least one beverage dispenser modular manifold and two end caps. The beverage dispenser modular manifold includes at least one inlet port for carbonated water, at least one outlet port for dispensing carbonated water, at least one inlet port for non-carbonated water, at least one outlet port for dispensing non-carbonated water, at least two connection ports for circulating carbonated water, and at least two connection ports for non-carbonated water. The connection ports are adapted for connection to another manifold and to end caps. Each end cap includes a connection port for noncarbonated water and two interconnected connection ports.

Another aspect of the invention is a beverage dispenser. The beverage dispenser includes at least one beverage dispenser modular manifold and two end caps. The dispenser modular manifold includes at least one inlet port for carbonated water, at least one outlet port for dispensing carbonated water, at least one inlet port for non-carbonated water, at least one outlet port for dispensing non-carbonated water, and at least six connection ports for circulating carbonated and non-carbonated water, wherein the connection ports are adapted for connection to an adapter extension and two end caps, wherein each end cap includes a connection port for non-carbonated water and two interconnected connection ports for routing carbonated water. The beverage dispenser also includes least one block connected to at least one outlet port for dispensing water, at least one mixing and dispensing valve connected to the at least one block, and tubing for syrup connected to the at least one mixing and dispensing valve.

Another aspect of the invention is a beverage dispenser. The beverage dispenser includes a housing, at least one beverage dispenser modular manifold, each beverage dispenser modular manifold comprising at least one inlet port for non-carbonated water, at least one inlet port for carbonated water, at least two outlet ports for dispensing at least one of non-carbonated water and carbonated water, and a plurality of connection ports for circulating carbonated water and non-carbonated water. The connection ports are adapted for connection to another manifold and two end caps. The beverage dispenser also includes two end caps connected to the at least one dispenser modular manifold, at least one block for each of the at least one dispenser modular manifolds, the at least one block connected to at least one outlet port for dispensing one of non-carbonated water and carbonated water, at least one mixing and dispensing valve connected to the at least one block, and tubing for syrup connected to each of the at least one mixing and dispensing valves.

These and many other aspects of the invention are described below.

BRIEF DESCRIPTION OF THE DRAWINGS

Further characteristics and advantages of the invention will more clearly arise from the following description, made by way of example and not meant to limit the invention, with reference to the enclosed drawings.

FIG. 1 is a schematic diagram of a beverage dispenser modular manifold;

FIG. 2 is a schematic diagram of an adapter extension for use between dispenser modular manifolds;

FIG. 3 is a schematic diagram of a system with three dispenser modular manifolds, two adapter extensions, and two end caps;

FIG. 9 is a perspective view of a beverage dispenser using a dispenser modular manifold;

FIG. 10 is a perspective view of a beverage dispenser using dispenser modular manifolds and syrup manifolds;

FIG. 11 is an exploded perspective view of a system of syrup manifolds with syrup manifold extensions between syrup manifolds;

DETAILED DESCRIPTION OF THE DRAWINGS AND THE PRESENTLY PREFERRED EMBODIMENTS

Water Manifolding

Figure 4:
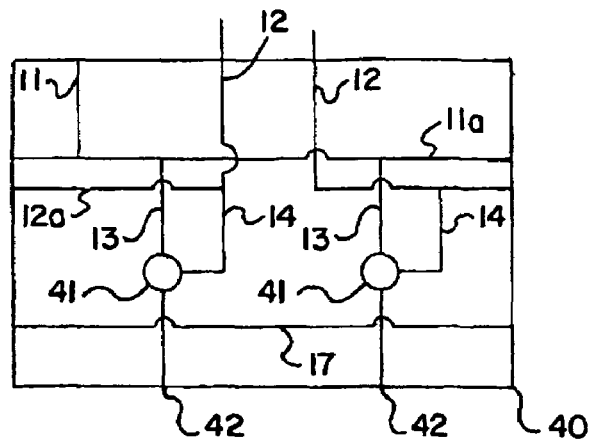
FIG. 4 is a second embodiment of a dispenser modular manifold.

Embodiments of the present invention include beverage dispensers and dispensers of ice and beverages, in which manifolds may be useful for selecting or routing a water, a concentrate, or a syrup. A water modular manifold may be used to select carbonated water or non-carbonated water. A water modular manifold may be used to expand water service to additional valves. A syrup manifold may be used to convey syrups, such as a concentrated syrup for a soft drink for mixing with carbonated water, or a concentrate, such as citrus, for mixing with non-carbonated water. A syrup manifold may also be used to extend syrup service to additional valves. The water modular manifolds may be connected to the dispensing valves and nozzles by valve blocks, selector blocks, adapter blocks, or other convenient devices.

A dispenser modular manifold for routing carbonated water and non-carbonated water in a beverage dispenser is depicted in schematic form in FIG. 1. Dispenser modular manifold 10 is molded from plastic, preferably ABS (acrylonitrile butadiene styrene). Any plastic or material approved by health authorities, such as the U.S. Food and Drug Administration, as a food zone material may be used. Other such materials include, but are not limited to, polycarbonate, nylon, acetal, and stainless steel. The plumbing lines and ports described below may thus be molded in, machined in, or added as separate components to manifold 10.

Dispenser manifold 10 includes a non-carbonated water inlet line 11, carbonated water inlet/outer or supply/return lines 12, a non-carbonated water routing line 11a, non-carbonated water outlet ports 11b, and carbonated water outlet ports 12b. The dispenser manifold includes a carbonated water recirculation line 17. Non-carbonated water is routed from non-carbonated water inlet line 11a to non-carbonated water outlet lines 13 and 15 and to non-carbonated water outlet ports 11b. Carbonated water is routed from carbonated water inlet line 12 to carbonated water outlet lines 14 and 16, and carbonated water outlet ports 12b. Dispenser manifold 10 is thus able to connect carbonated and non-carbonated water to two valves for dispensing beverages through outlet pairs 11b, 12b.

A source of non-carbonated water may be connected to non-carbonated water inlet port 11c, and a source of circulating carbonated water may be connected to carbonated water inlet port 12c. Manifold 10 may additionally be connected to end caps or to other manifolds by the ports 11b and 12b. Manifold 10 may additionally be connected to other manifolds or to end caps via ports 17a to carbonated water recirculation line 17. If no other manifolds are connected to manifold 10, an end cap, described below, essentially deadheads non-carbonated water circulation line 111 at both ports 11b. The end cap will also connect carbonated water line 12 to recirculation line 17, by connecting ports 12b and 17a on both sides of the manifold. This allows carbonated water to recirculate, thus keeping the carbonated water fresh. The circulation also allows chilled carbonated water to exchange heat, by rejecting heat to a cold plate or through mechanical refrigeration, and by cooling syrup, non-carbonated water, or any device with which the circulating carbonated water is in contact.

Dispenser manifold 10 may be connected to another manifold through an adapter extension, as depicted in FIG. 2. Adapter extension 20 provides for continuity of the noncarbonated water line 21 through ports 21a, and for continuity of the carbonated water line 22 though ports 22a. Carbonated water recirculation line 27 provides continuity through ports 27a. It is convenient if the ports on the adapter extension are male, ports that extend from the body of extension 20, and if at least the mating ports on manifold 10 are female. In at least one embodiment, the adapter extension may thus plug conveniently into the manifold, one on each side if desired. Adapter extension 20 may also be molded or machined as described above using the same materials as manifold 10.

FIG. 3 is a schematic diagram of a manifold system 30 for a beverage dispenser. Manifold system 30 includes three manifolds in series, connected via adapter extensions and capped with end caps. Parent manifold 10 is the same embodiment of FIG. 10, and is called the parent manifold because only manifold 10 is connected to the sources of carbonated and non-carbonated water through inlet lines 11,12, and only manifold 10 recirculates carbonated water through outlet port 18a. The other manifolds may be considered "child" or "children" manifolds. FIG. 3 does not depict all the internal plumbing of parent manifold 10 and manifolds 19, which are identical, except that the ports corresponding to inlets 11c, 12c, and outlets corresponding to outlet port 18a may be capped rather than used.

Arrows depict the preferred direction of fluid flow in the system. By adding manifolds, the system is thus expandable from the two nozzles of manifold 10 in FIG. 1 to the three manifolds and six outlet pairs, 11b, 12b, of FIG. 3. A single manifold may instead be added, or as many additional manifolds as desired, so long at the supplies of water and syrup do not exhaust the pressure capabilities of the water or the syrup or concentrate used. The components of the system, manifolds 10, 19, adapter extensions 20, and end caps 25, are preferably designed so that the assembled system, in virtually any combination, has the same length on the front and on the rear of the system, all components having the same height and width.

Non-carbonated water enters parent manifold 10 through inlet line 11 and is circulated via non-carbonated water line 11a to adapter extensions 20 via non-carbonated water lines 11 in the adapter extensions. The non-carbonated water then extends to manifolds 19 and their non-carbonated water lines 11a. The non-carbonated water then deadheads against end caps 25. Carbonated water enters parent manifold 10 from a source of carbonated water through a first carbonated water line 12 and is circulated via carbonated water line 12a through carbonated water lines 12a in adapter extensions 20 and manifolds 19.

When carbonated water reaches end caps 25, carbonated water is recycled from carbonated water line 12a through line 26 in end cap 25, and to recirculation line 17 in manifolds 10 and 19. The carbonated water then recirculates to the source of carbonated water through the second carbonated water line 17 or 18. The end caps preferably have three connections or ports, two inlets for carbonated and non-carbonated water, and a single outlet, for recirculating the carbonated water. The ports are desirably male, for connecting in a convenient, leak-free connection to adapter extensions 20. End caps 25 may also be molded or machined as described above using the same materials as manifold 10.

Each outlet pair, 11b and 12b, is connected internally as shown in FIG. 1 to the carbonated water and non-carbonated water lines. The system depicted in FIG. 3 may be used to supply water to six valves. Using this system, the only connections needed are thus carbonated water in, carbonated water out, and non-carbonated water in. Some system may also recycle non-carbonated water so that it too may be used to cool syrup or beverages. In such cases, a second non-carbonated water outlet line may be plumbed and connected as described above for circulating the carbonated water.

Other embodiments of a modular manifold may be used, such as a manifold which allows a user to select the water of choice from each outlet pair. FIG. 4 depicts a selecting manifold 40. Selecting manifold 40 is similar to manifold 10 described above, but includes selectors 41 that allow a user to select carbonated or non-carbonated water for routing to outlet ports 42. Non-carbonated water inlet line 111 and routing line 11a, and carbonated water inlet line 12 and routing line 12a are similar to those in manifold 10, but in manifold 40 they connect respectively to lines 13, 14, which are routed to selectors 41. The selector may be a three-way valve, a solenoid, a plunger, or any other device by which a user or a controller may choose carbonated water on non-carbonated water for routing to outlet ports 42. Manifold 40 may also include carbonated water recirculation line 17. Manifold 40 may be connected in the same manner as described above for manifold 10.

Figure 5:
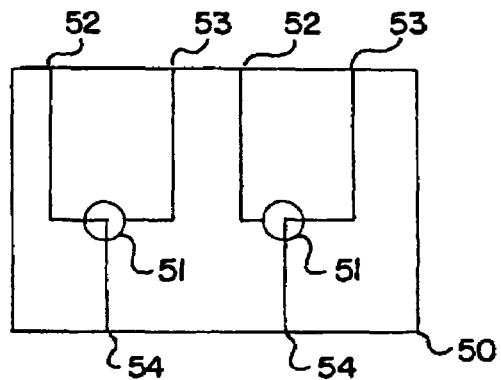
FIG. 5 is a schematic diagram of a selector block.

Beverage dispensers using the first embodiment of the dispenser manifold may find it advantageous to use a selector block immediately downstream of the manifold for each pair of water outlets. The selector block may be used to select carbonated water or non-carbonated water for the beverage to be dispensed from the valve and nozzle downstream of the selector block. A selector block 50 is depicted in FIG. 5. The selector block includes input ports 52 for non-carbonated water and input ports 53 for carbonated water. A selector 51 is used to select one desired water or the other for routing to outlet ports 54. select one desired water or the other for routing to outlet ports 54.

Selector 51 may be a mechanical or electromechanical selector. The selector may be a three-way valve as depicted, or alternatively, may be a plunger, a solenoid-activated linear or rotary three-way valve. Preferably, selector 51 may be actuated without the need for shutting off the water inlets to selector block 50. In FIG. 5, the valve on the left has been turned to select non-carbonated water for the output, and the valve on the right has been turned to select carbonated water for its output. Selector blocks may be molded from materials as described above for dispenser manifolds, and are preferably molded from ABS and assembled with a three-way valve or other selector.

Figure 6:
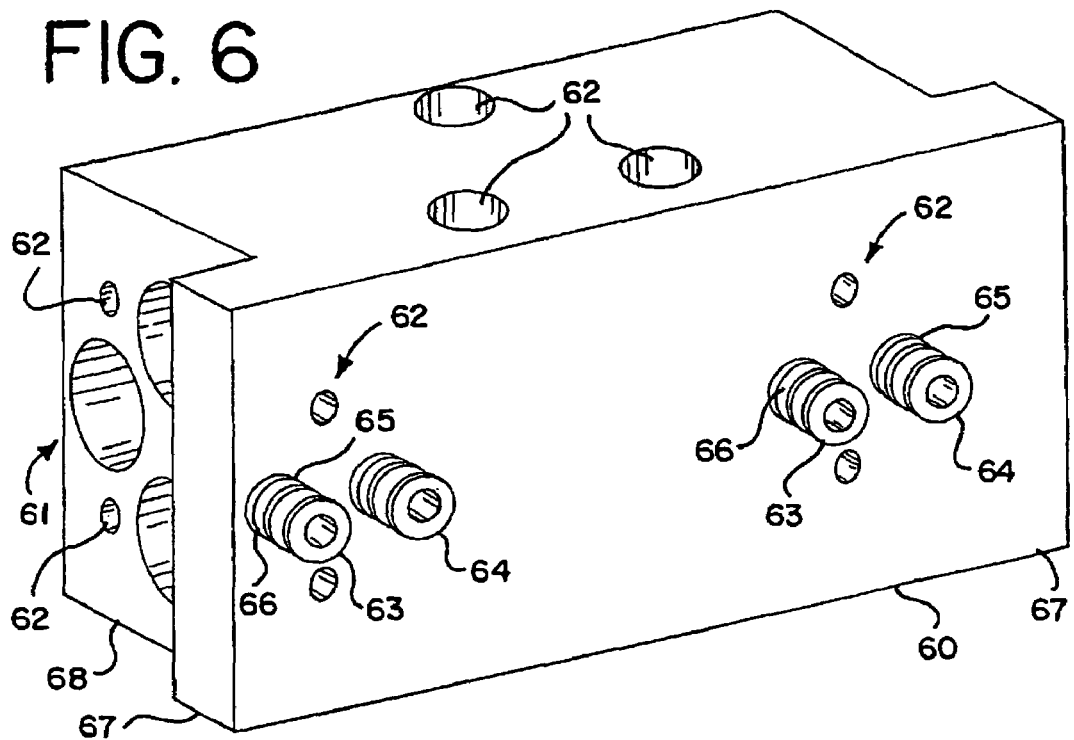
FIG. 6 is perspective view of a dispenser modular manifold.

A preferred embodiment of a dispenser modular manifold 60 is depicted in FIG. 6. The manifold is preferably molded and includes outlet ports 61 (larger orifices) for carbonated water and non-carbonated water, and a return or recirculation line for the carbonated water. As shown, ports 61 are preferably female, so that manifold 60 may be mated with an adapter extension or end cap without the need for a great deal of plumbing time or expertise. While this perspective drawing includes three ports 61 on the left side, the right side (not shown) also has three female ports for the three water lines. In addition, the bottom or back of the manifold (or any face of the manifold), has up to four inlet/outlet ports for water as described above for manifold 10.

Manifold 60 may also have mounting holes 62, as shown on the sides, front and top, for structural support or orientation in the beverage dispenser of which manifold 60 is a part. Mounting holes in two parts may be used in conjunction with a pin or other structural member to connect, support and orient the parts with respect to each other. For instance, mounting holes 62 on front face 67 may be used to orient or support selector blocks 50 or adapter blocks downstream of the water outlets.

Carbonated water outlet ports 63 and non-carbonated water outlet ports 64 are preferably male as shown, with lands 65 and grooves 66 for O-rings for quick connection to selector blocks. Other ports or interfaces may be used, such as quick disconnects or swaged fittings. The ports may be molded or machined as integral parts of manifold 60, or the ports may be molded or machined separately for assembly into the manifold. For instance, instead of integral male ports, a nipple may be used, with roughly the same configuration as shown in outlet port 63 or 64, and with a matching part (lands and one or two grooves for O-rings) inserted into the manifold. Manifold 60 is preferably manufactured with a wider frontal area 67 and a narrower rear area 68 so that adapter extensions and end caps will readily fit to the side of manifold 60 and the system will have uniform dimensions across the front and rear, as well as all components having the same height and width.

Figure 7:
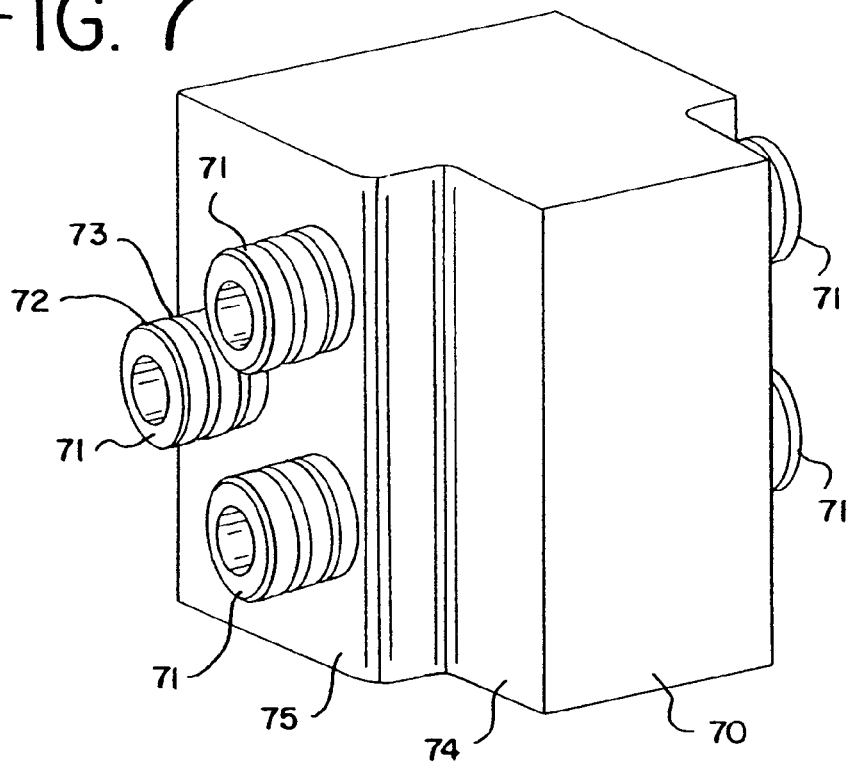
FIG. 7 is a perspective view of an adapter extension for use between dispenser modular manifolds.

An adapter extension 70 is depicted in perspective view in FIG. 7. Adapter extension 70 has a narrower front area 74 and a broader rear area 75 for mating with parent and child manifolds and end caps as described above. The function of the adapter extension is simply to continue three water lines. The adapter extension preferably accomplishes the continuation with three male ports 71 on each side. Only the left side is shown in detail in FIG. 7, with the right side being similar to the left. Each port 71 may include lands 72 and grooves 73 for O-rings, for quick fits and good sealing. As mentioned above for the manifolds, the ports may be integrally machined or molded as part of the extension, or discrete plumbing parts, such as nipples, may be used. Other connectors may instead be used, as are will known in the plumbing and water supply arts. While not shown in FIG. 7, the adapter extension may also include mounting holes for structural or orientation purposes.

Figure 8:
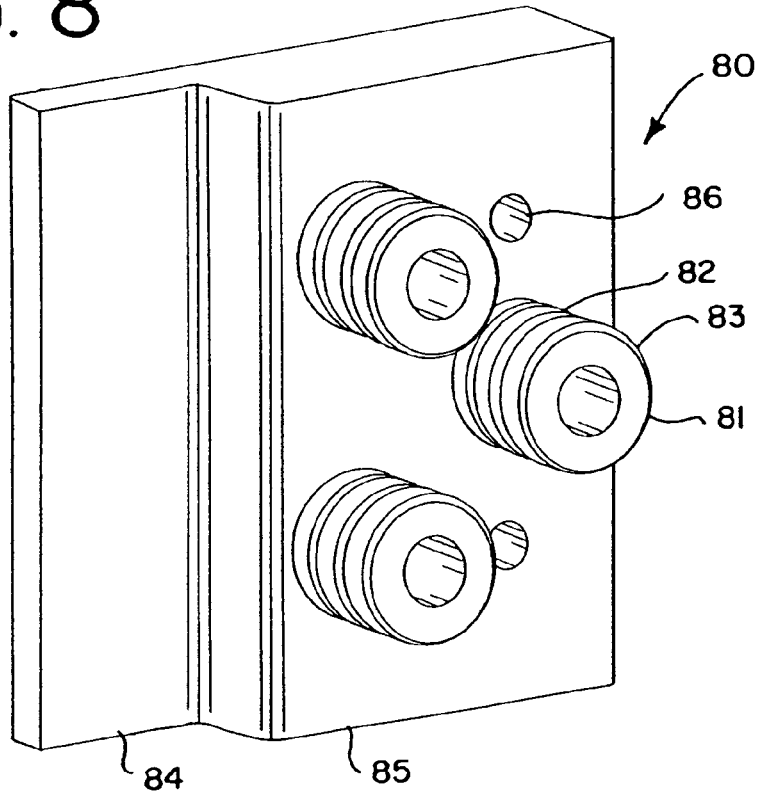
FIG. 8 is a perspective view of an end cap for use with a dispenser modular manifold.

End caps are useful in manifold systems according to the present invention. A perspective view of an end cap 80 is presented in FIG. 8. End cap 80 preferably has three ports 81, each port a male with lands 82 and grooves 83 for accommodating O-rings. The frontal area 84 of the end cap is preferably a little narrower and the rearward area 85 a little wider, so that the end cap fits snugly with either an adapter extension or a manifold. As described above, one port 81 is used to dead-head or terminate the non-carbonated water line, while the other two ports are used for receiving and recirculating carbonated water. End cap 80 may also include holes 86 for receiving a pin or other member for structural support or for orientation. Holes 86 may be blind holes for the pin to connect to an adapter extension or a manifold. Alternately, hole 86 may be a through-hole and may be used to mount or orient end cap 80 to a structural portion (not shown) of the beverage dispenser of which the end cap and manifold system is an important part.

Modular manifolds may be used in beverage dispensers, allowing a user to select as many dispensing stations or nozzles as desired. Each manifold described herein may be used to add one or two additional stations; similar manifolds may be used for one or three additional stations. A beverage dispenser with a single two-station manifold as described above is depicted in FIG. 9. Beverage dispenser 90 includes two dispensing stations or nozzles 96 for consumers. Beverage dispenser 90 includes a single manifold 10, which interfaces with two selector blocks 92 (only one visible in FIG. 9). The selector blocks interface with valves 95 through adapter blocks 94. Adapter blocks 94 may be simply adapter interfaces or may have other functions, such as being used to select a syrup or concentrate routed to valve 95. Valve 95 includes a nozzle 96 for consumer use.

Beverage dispenser 90 also includes piping or plumbing for water to manifold 10. The piping preferably includes carbonated water in 97, carbonated water recycle 98, and one or more lines 99 for non-carbonated water. The beverage dispenser also includes mechanical or structural components, such as frame 91 for mounting to a housing (not shown). It may be useful to provide additional structural support in the valve train from manifold 10 to valve 96, such as a bracket 93. Bracket 93 may be formed from sheet metal and used as appropriate to support selector blocks or adapter blocks, or both. The bracket may be placed as desired for the best structural support, so that customers perceive as little vibration and shaking as possible when dispensing a beverage.

Water and Syrup Manifolding

A more sophisticated and larger beverage dispenser 100 is depicted in FIG. 10. Beverage dispenser 100 includes a single parent manifold 10, two child manifolds 19, two adapter extensions 20 and two end caps 25, all connected as described above in FIG. 3. The system includes six dispensing valves 95 with adapter blocks 105 and nozzles 107, each valve with a selector block 50 and a selector 51 (not shown) for selecting a water for each valve. Carbonated water is piped in to parent manifold 10 via piping 11 and is recirculated via outlet piping 18. Non-carbonated water may be piped in via pipes 12 (not shown); one pipe 12 may instead be used to distribute non-carbonated water. In addition, the manifolds may include additional or alternate connections for recycling cooling loops 104 for carbonated or non-carbonated water.

The recirculating water may be used to keep cool the components of the system or the syrup and syrup lines which form an important part of the beverage dispensing system. The housing for the beverage system may include an ice storage bin and a cold plate used to cool recirculating water. One or more cooling loops 104 may be embedded in such a cold plate. In other beverage dispensers, there may be an integral ice maker with mechanical refrigeration. Cooling loops 104 may be routed near the evaporator in such a system to help cool the recirculating water. Details of these systems are included in U.S. Pat. No. 6,196,007, and U.S. Pat. No. 6,698,229, assigned to the assignee of the present patent, and which are hereby incorporated by reference in their entirety.

The syrup systems form another part of beverage dispenser 100. Syrup is routed in similar manifolds 101 with similar extensions 111 and end caps (not shown). Syrup is piped to center manifold 101 through one or more pipes or tubing 102. Syrup is piped through center manifold 101 through one or more pipes or tubes 102a to the center adapter block 105. In the center manifold 101, syrup is piped to lines 109 (see FIG. 11) with a right-angle connector between piping or tubing 102 and ports 113, 114 on the bottom side of the manifold 101 (see FIG. 11). Other piping arrangements may also be used to minimize the number of syrup sources required.

FIG. 11 depicts a perspective view of syrup manifolds 101, 101a, and extensions 111 used to connect the syrup manifolds. Extensions 111 include syrup ports 117 which connect internal piping within the extensions (not shown). Manifolds 101, 101a may be the exact same part, with manifold 101 presenting a top view of the manifold and manifold 101a presenting a bottom view of the same manifold. The manifold includes a series of through holes 115 and connecting lines 109. Connecting lines 109 are used to route syrup from one manifold to another. Through holes 115 are used to allow passage of piping or tubing 102a to a syrup selector or to a mixing and dispensing valve. The through holes also allow passage of water pipes 11, 18 to water manifold 10. Thus, as shown in FIG. 10, at least one syrup tube 102 connects to manifold 101 at a right angle, allowing syrup to flow laterally in connecting lines 109 from center manifold 101.

Syrup is routed to side manifolds 101a through extensions 111 in the same manner as described above for the water manifolds. Side manifolds 101a may be physically the same as center manifold 101. Connecting lines 109 are connected to left ports 113 and right ports 114 on only one side of the manifold. As shown in FIG. 11, the left or right ports 113, 114, are used to conveniently connect syrup through tubing or piping 103 to adapter blocks 105 for the extension water manifolds 19. Through holes 115 are typically used only in the center manifold so that syrup can be routed directly to adapter blocks 105, or if desired, directly to the center mixing and dispensing nozzles. In the side manifolds 101a, the ports that are not used may be blocked off, for instance with caps if male ports are used or with plugs if female ports are used. The ports for the syrup manifolds and extensions are similar to the ports for the water manifolds, but may be of smaller diameter, and are preferably all male or female on one end for mating with the opposite on another end. End caps may be used or the ports 109 on the ends may simply be plugged or capped.

Figure 12:
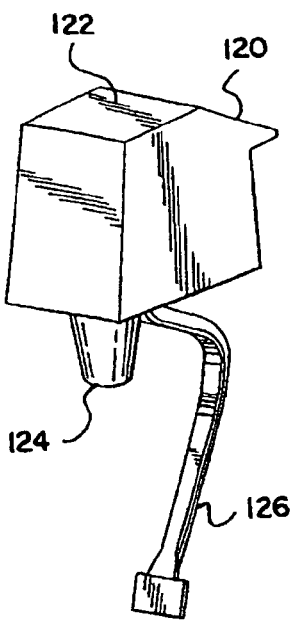
FIG. 12 depicts a beverage valve and nozzle.
Figure 13:
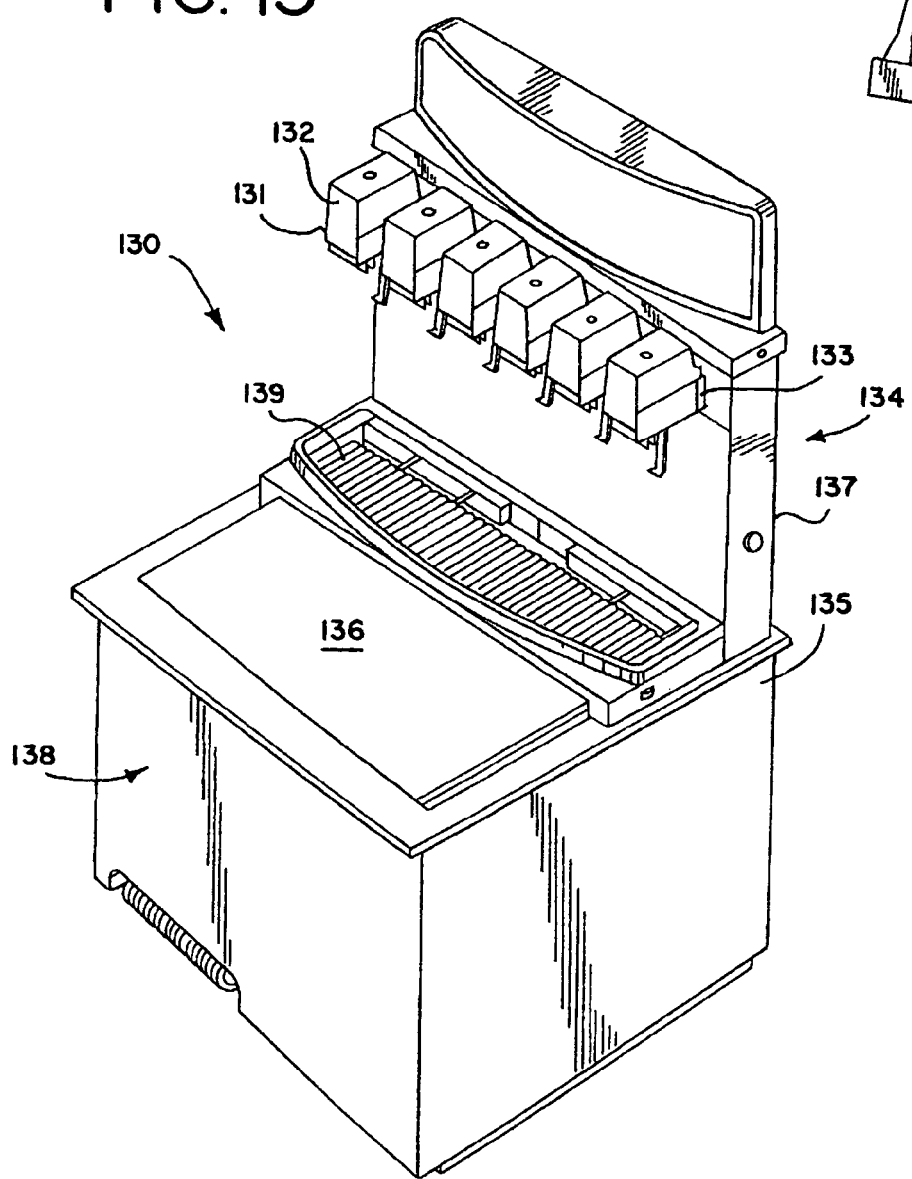
FIG. 13 depicts a beverage dispenser with embodiments of the present invention.

A beverage is dispensed from a beverage dispenser that uses a valve as shown in FIG. 12. Valve 120 preferably includes a valve housing 122, an outlet nozzle 124, and an actuator to begin dispensing, such as actuating lever 126. The water manifolds, syrup manifolds, and beverage manifolds are meant for use within a beverage dispenser, such as the beverage dispenser 130 in FIG. 13. Beverage dispenser 130 contains three valve pairs, making beverage dispenser 130 suitable for water manifold system 30 described above, which has water manifolds and piping for six beverage valves. Beverage dispenser 130 may include a lower housing 135 and an upper housing 137. Lower housing 135 may include an ice chest or ice bin 138 (not shown) and an ice chest lid 136. The ice bin may include a cold plate on which the ice rests. Water may circulate or recirculate within the cold plate for cooling water and syrup and helping to insure that the consumer receives a cold beverage when the beverage is casually dispensed. Upper housing 137 may also include a tower heat exchanger for cooling syrup and water lines on their way to valves 131 for the beverages. The valves may include valve housings 132; water selector modules 133 may also be connected to the valve pairs. Water manifolds and syrup manifolds described above may be contained within beverage dispenser 130, preferably in the upper housing near valves 131.

It is intended that the foregoing detailed description be regarded as illustrative rather than limiting. While this invention has been shown and described in connection with the preferred embodiments, it is apparent that certain changes and modifications, in addition to those mentioned above, may be made from the basic features of this invention.

For example, while embodiments using three beverage dispenser manifolds have been depicted, other quantities may also be used, and dispensers with a single manifold or five manifolds may be readily employed. Manifolds that are about 6 inches wide (about 15 cm) with provisions for attaching to two mixing and dispensing valves have been described, but larger manifolds may instead or additionally be used. While housings have not been described in great detail, sheet metal or plastic molded housing panels which are combinable may be used to readily vary the size of the housing protecting the water and beverage manifolds used in beverage dispensers according to the present invention.

While plastic tubing and manifolds are preferred, the manifolds and components used in the present invention may also be made from FDA-approved metals, such as stainless steel, though at greater expense. Accordingly, it is the intention of the applicants to protect all variations and modifications within the valid scope of the present invention. It is intended that the scope and spirit of the invention be defined by the following claims, including all equivalents.

What is claimed is:

1. A combination of at least one beverage dispenser modular manifold and two end caps, wherein the beverage dispenser modular manifold comprises:
   at least one inlet port for carbonated water;
   at least one outlet port for dispensing carbonated water;
   at least one inlet port for non-carbonated water;
   at least one outlet port for dispensing non-carbonated water; and
   at least two connection ports for circulating carbonated water;
   wherein the connection ports are adapted for connection to another
   manifold and to the end caps; and
   wherein each end cap comprises:
   a connection port for noncarbonated water and two interconnected connection ports for routing carbonated water.

2. The combination of claim 1, further comprising at least one adapter extension connected to the beverage dispenser modular manifold, and a second beverage dispenser modular manifold connected to the adapter extension, wherein carbonated water and non-carbonated water are routed through the adapter extension to the second dispenser modular manifold, and wherein the carbonated water is recirculated to the outlet port for carbonated water.

3. The combination of claim 2, wherein the adapter extension comprises six connection ports for routing water.

4. The combination of claim 1, further comprising at least two adapter blocks and two mixing and dispensing valves connected to the outlet pods.

5. The combination of claim 1, further comprising at least one adapter block connected to at least one outlet port for dispensing water.

6. The combination of claim 1, further comprising at least one selector block connected to at least one outlet port for dispensing water.

7. The combination of claim 1, further comprising at least one mixing and dispensing valve connected with at least one outlet port for dispensing water.

8. The combination of claim 1, further comprising at least one mixing and dispensing valve connected with at least one outlet port for dispensing water, the at least one mixing and dispensing valve connected with at least two sources of syrup.

9. The combination of claim 1, further comprising two adapter extensions, and two additional dispenser modular manifolds, wherein carbonated water and non-carbonated water are routed through the connection ports for circulating water through the adapter extensions to the additional dispenser modular manifolds, and wherein the carbonated water is recirculated to the outlet port for carbonated water.

10. The combination of claim 1, further comprising a syrup modular manifold, the syrup modular manifold outputting a selected syrup, and a mixing and dispensing valve, the valve receiving water from the dispenser modular manifold and syrup from the syrup modular manifold.

11. The combination of claim 10, further comprising an adapter block between the beverage dispenser modular manifold and the mixing and dispensing valve.

12. The combination of claim 1, further comprising selectors for routing carbonated water and non-carbonated water to the outlet ports for dispensing water.

13. A beverage dispenser, comprising:
   a housing;
   at least one beverage dispenser modular manifold and two end caps, the dispenser modular manifold comprising at least one inlet port for carbonated water, at least one inlet port for non-carbonated water, at least one outlet port for dispensing carbonated water, at least one outlet port for dispensing non-carbonated water, and at least six connection ports for circulating carbonated and non-carbonated water, wherein the connection ports are adapted for connection to an adapter extension and two end caps, and wherein each end cap comprises a connection port for non-carbonated water and two interconnected connection ports for routing carbonated water;
   at least one block connected to at least one outlet port for dispensing water;
   at least one mixing and dispensing valve connected to the at least one block; and
   tubing for syrup connected to the at least one mixing and dispensing valve.

14. The combination of claim 13, further comprising selectors for routing carbonated water and non-carbonated water to the outlet ports for dispensing water.

15. The beverage dispenser of claim 13, wherein the beverage dispenser modular manifold further comprises selectors for routing carbonated water or non-carbonated water to the at least two outlet ports for dispensing water.

16. The beverage dispenser of claim 13, wherein the at least one beverage dispenser modular manifold comprises three beverage dispenser modular manifolds and further comprising two adapter extensions between the beverage dispenser modular manifolds, wherein carbonated water and non-carbonated water are routed through the adapter extensions to two additional beverage dispenser modular manifolds, and wherein the carbonated water is recirculated to the outlet port for carbonated water.

17. The beverage dispenser of claim 13, further comprising a syrup modular manifold, the syrup modular manifold comprising at least two syrup inlets and at least two syrup outlets, wherein the at least two syrup outlets are connected by the tubing to the at least one mixing and dispensing valve.

18. A beverage dispenser, comprising:
a housing;
at least one beverage dispenser modular manifold, each beverage dispenser modular manifold comprising at least one inlet port for carbonated water, at least one inlet port for non-carbonated water, at least two outlet ports for dispensing at least one of non-carbonated water and carbonated water, a plurality of connection ports for circulating carbonated water and non-carbonated water, wherein the connection ports are adapted for connection to another manifold and to end caps;
two end caps connected to the at least one dispenser modular manifold, wherein each end cap comprises:
a connection port for noncarbonated water and two interconnected connection pods for routing carbonated water;
at least one block for each of the at least one dispenser modular manifolds, the at least one block connected to at least one outlet port for dispensing one of non-carbonated water and carbonated water;
at least one mixing and dispensing valve connected to the at least one block; and
tubing for syrup connected to each of the at least one mixing and dispensing valve.

19. The beverage dispenser of claim 18, wherein the at least one dispenser modular manifold comprises a plurality of dispenser modular manifolds, and further comprising an adapter extension between each pair of modular manifolds.

20. The beverage dispenser of claim 18, further comprising a syrup modular manifold connected to the tubing, the syrup modular manifold comprising piping to at least two syrups.

* * * * *

UNITED STATES PATENT AND TRADEMARK OFFICE
CERTIFICATE OF CORRECTION

PATENT NO. : 7,287,671 B2  Page 1 of 1
APPLICATION NO. : 11/107165
DATED : October 30, 2007
INVENTOR(S) : James R. Morrow, Sr. et al.

It is certified that error appears in the above-identified patent and that said Letters Patent is hereby corrected as shown below:

In the Claims

In column 9, claim 4, line 64, after "to the outlet" replace "pods" with --ports--.

In column 12, claim 18, line 1, after "interconnected connection" replace "pods" with --ports--.

Signed and Sealed this

Seventh Day of December, 2010

David J. Kappos
*Director of the United States Patent and Trademark Office*